US012783222B1

(12) United States Patent
Kant et al.

(10) Patent No.: US 12,783,222 B1
(45) Date of Patent: Nov. 3, 2026

(54) MANAGING COMPUTE CLUSTERS FOR DATA PLATFORMS

(71) Applicant: Cohesity, Inc., San Jose, CA (US)

(72) Inventors: Chandra Kant, Bangalore (IN); Venkatesh Prabhakar, Saratoga, NY (US); Adarsh Antony, Bangalore (IN); Jayant Karanjekar, Vancouver (CA)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 19/005,837

(22) Filed: Dec. 30, 2024

(51) Int. Cl.

| | |
|---|---|
| ***G06F 8/60*** | (2018.01) |
| ***G06F 8/70*** | (2018.01) |
| *G06F 8/61* | (2018.01) |
| *G06F 8/65* | (2018.01) |
| *G06F 8/658* | (2018.01) |
| *G06F 8/71* | (2018.01) |
| *G06F 8/76* | (2018.01) |
| *G06F 11/20* | (2006.01) |

(52) U.S. Cl.
CPC .................. *G06F 8/60* (2013.01); *G06F 8/70* (2013.01); *G06F 8/61* (2013.01); *G06F 8/63* (2013.01); *G06F 8/65* (2013.01); *G06F 8/658* (2018.02); *G06F 8/71* (2013.01); *G06F 8/76* (2013.01); *G06F 11/2007* (2013.01)

(58) Field of Classification Search
CPC .... G06F 11/2007; G06F 11/2005; G06F 8/60; G06F 8/70; G06F 8/65
See application file for complete search history.

(56) References Cited

U.S. PATENT DOCUMENTS

| | | | | |
|---|---|---|---|---|
| 11,003,434 | B2 * | 5/2021 | Duvur | G06F 8/65 |
| 11,474,873 | B2 * | 10/2022 | Biernat | G06F 9/5072 |
| 11,496,323 | B1 * | 11/2022 | Caceres | H04L 9/3263 |
| 11,507,364 | B2 * | 11/2022 | Duvur | G06F 8/65 |
| 11,983,524 | B2 * | 5/2024 | Dai | G06F 9/5077 |
| 12,137,351 | B2 * | 11/2024 | Kumar | G06F 9/4806 |
| 12,141,025 | B2 * | 11/2024 | Baldassarre | G06F 11/1482 |

(Continued)

OTHER PUBLICATIONS

Busscher, "Do You Really Need Kubernetes?", Payara Services Ltd, Jun. 9, 2021, 10 pp.

(Continued)

*Primary Examiner* — Jonathan D Gibson
(74) *Attorney, Agent, or Firm* — Shumaker & Sieffert, P.A.

(57) ABSTRACT

In general, techniques are described that enable a computing system comprising a memory and processing circuitry to manage computing devices and deployment of a data platform. The memory may store services forming a control plane of a data platform. The processing circuitry may execute a container orchestration platform that configures the computing devices to execute a container, and execute the container managed by the container orchestration platform to implement an application orchestrator that interfaces with the container orchestration platform to automatically manage deployment of the services forming the control plane of the data platform. The application orchestrator may obtain an indication of an underlying architecture of the one or more computing devices, and automatically deploy, based on the indication of the underlying architecture of the computing devices, the services forming the control plane as containers managed by the container orchestration platform.

20 Claims, 5 Drawing Sheets

(56) References Cited

U.S. PATENT DOCUMENTS

| | | | | |
|---|---|---|---|---|
| 12,306,734 | B2 * | 5/2025 | Deboy | G06F 11/079 |
| 2019/0324786 | A1 * | 10/2019 | Ranjan | G06F 9/45558 |
| 2019/0370133 | A1 * | 12/2019 | Salapura | G06F 12/02 |
| 2021/0019135 | A1 * | 1/2021 | Hwang | G06F 9/4881 |
| 2021/0263779 | A1 * | 8/2021 | Haghighat | G06F 11/3495 |
| 2021/0311764 | A1 * | 10/2021 | Rosoff | G06F 9/44505 |
| 2023/0337019 | A1 * | 10/2023 | Mehta | H04W 24/04 |
| 2024/0012693 | A1 * | 1/2024 | Jigalur | G06F 9/45558 |
| 2024/0028322 | A1 * | 1/2024 | Wu | G06F 9/45558 |
| 2024/0028323 | A1 * | 1/2024 | Gopireddy | G06F 8/65 |
| 2024/0028441 | A1 * | 1/2024 | Lan | G06F 11/0709 |
| 2024/0080242 | A1 * | 3/2024 | Lee | H04L 47/803 |
| 2024/0231873 | A1 * | 7/2024 | Jigalur | G06F 9/45558 |
| 2025/0298689 | A1 * | 9/2025 | Pourmohseni | G06F 9/5072 |
| 2026/0064405 | A1 * | 3/2026 | Chibon | G06F 8/71 |

OTHER PUBLICATIONS

Cohesity, “Helios”, 2019, 2 pp., URL: https://www.dataguardworks.com.au/datasheets/cohesity-helios-data-sheet.pdf (Applicant points out, in accordance with MPEP 609.04(a), that the year of publication, 2019, is sufficiently earlier than the effective U.S. filing date, so that the particular month of publication is not an issue.).

U.S. Appl. No. 18/780,173, filed Jul. 22, 2024, naming inventors Kant et al.

* cited by examiner

MANAGING COMPUTE CLUSTERS FOR DATA PLATFORMS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

A file system snapshot is a point-in-time copy or representation of the entire file system or a specific subset of it. A snapshot captures the state of files and directories at a particular moment, providing a snapshot of the file system data as it existed at that specific point. File system snapshots are often used for backup and recovery purposes and can offer benefits in terms of data protection and system consistency. The file system data can include file system objects (e.g., files, directories, volumes, virtual machines, databases, etc.), metadata, or both.

A network cluster that includes a number of different network servers (e.g., virtual network servers and/or physical network clusters) interconnected may execute the data platform. The network cluster may have varying architectures, which may make deployment of the data platform (including a control plane of the data platform) difficult to manage, especially over the life cycle of the network cluster where various network servers may fail (e.g., due to network connectivity issues, hardware failures, etc.). Redeploying the data platform to account for network connectivity and/or server failure may require extensive understanding of the network cluster and usually involves manual redeployment and/or troubleshooting to redeploy the data platform within the changed network cluster.

SUMMARY

In general, this disclosure describes techniques for unified management of compute clusters in support of a data platform. Rather than maintain separate code paths for each compute cluster architecture (e.g., a code path for software as a service-SaaS-multi-cloud management, a separate different code path for on premises deployment of multi-cluster management, etc.), a single code path for a unified multi-cluster manager may simplify the code base and enable more rapid deployment of data platforms within any given network cluster architecture. In addition, the multi-cluster manager provided in accordance with various aspects of the techniques described in this disclosure may scale beyond a single compute node, providing high availability when compute clusters executing the data platform change (e.g., due to network connectivity issues, hardware failure, etc.). The multi-cluster manager may enable automated deployment and redeployment of resources across the changed compute cluster regardless of the underlying architecture and/or form factors.

In this respect, the multi-cluster manager may provide a set of abstractions that enable deployment across different compute cluster architectures and/or different form factors. Development of the multi-cluster manager is premised on a feature-based approach rather than environment-based development. The multi-cluster manager may execute within an compute cluster managed by a container orchestration platform (e.g., Kubernetes, Docker Swarm, Apache Mesos with Marathon, Amazon Elastic Kubernetes Service-EKS, Google Kubernetes Engine-GKE, Microsoft Azure Kubernetes Service-AKS, Rancher, OpenShift, Nomad, etc.), and may analyze events identified by the container orchestration platform to take remedial actions and/or prospective actions to ensure a correct number of container workloads are executing to properly support the data platform. The multi-cluster manager may synchronize data between container workloads (which refer to a group of one or more containers that share resources and are scheduled to execute together) in order to maintain high availability, providing data streams between nodes that support the container workloads to synchronize the data and enable rapid failover between nodes.

The techniques of this disclosure may provide one or more technical advantages that realize one or more practical applications. The unified multi-cluster manager may automatically identify and configure resources (e.g., ports, memory, processing capacity, etc.) to support execution of the data platform along with the unified multi-cluster manager regardless of the underlying compute cluster architecture. The unified multi-cluster manager may simplify deployment compared to multi-cluster managers developed for a specific network architecture in that the unified multi-cluster manager may automatically identify, install, and configure the resources required for the unified multi-cluster manager regardless of the underlying network architecture. Rather than resort to execution of the multi-cluster manager by a single node (which may fail and thereby prevent execution of the multi-cluster manager), the unified multi-cluster manager may provide data streams to synchronize data between nodes used to execute the unified multi-cluster manager (which may also be referred to as "data synchronization"), enabling high availability and/or fault tolerance within the underlying nodes regardless of the compute cluster architecture. The unified multi-cluster manager may also manage redeployment automatically between nodes when one or more nodes fail, leave the compute cluster, or experience network connectivity issues.

In one example, various aspects of the techniques are directed to a method comprising: executing, by one or more computing devices, a container orchestration platform that configures the one or more computing devices to execute one or more containers; executing, by the one or more computing devices, the one or more containers within the container orchestration platform to implement an application orchestrator that interfaces with the container orchestration platform to automatically manage deployment of a plurality of services forming a control plane of a data platform; obtaining, by the application orchestrator, an indication of an underlying architecture of the one or more computing devices; and automatically deploying, by the application orchestrator, and based on the indication of the underlying architecture of the one or more computing devices, the plurality of services forming the control plane as the one or more containers managed by the container orchestration platform.

In another example, various aspects of the techniques are directed to a computing system comprising: a memory configured to store a plurality of services forming a control plane of a data platform; and processing circuitry configured to: execute a container orchestration platform that configures the one or more computing devices to execute one or more containers; and execute the one or more containers managed by the container orchestration platform to implement an application orchestrator that interfaces with the container orchestration platform to automatically manage deployment of the plurality of services forming the control plane of the data platform, wherein the application orchestrator is configured to: obtain an indication of an underlying architecture of the one or more computing devices; and automatically deploy and based on the indication of the underlying architecture of the one or more computing devices, the plurality of services forming the control plane as the one or more containers managed by the container orchestration platform.

In another example, various aspects of the techniques are directed to a computer program product comprising non-transitory computer-readable media storing instructions that, when executed, cause processing circuitry to: processing circuitry configured to: execute a container orchestration platform that configures the one or more computing devices to execute one or more containers; and execute one or more containers within the container orchestration platform to implement an application orchestrator that interfaces with the container orchestration platform to automatically manage deployment of a plurality of services forming a control plane of a data platform, wherein the application orchestrator is configured to: obtain an indication of an underlying architecture of the one or more computing devices; and automatically deploy and based on the indication of the underlying architecture of the one or more computing devices, the plurality of services forming the control plane as the one or more containers managed by the container orchestration platform.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
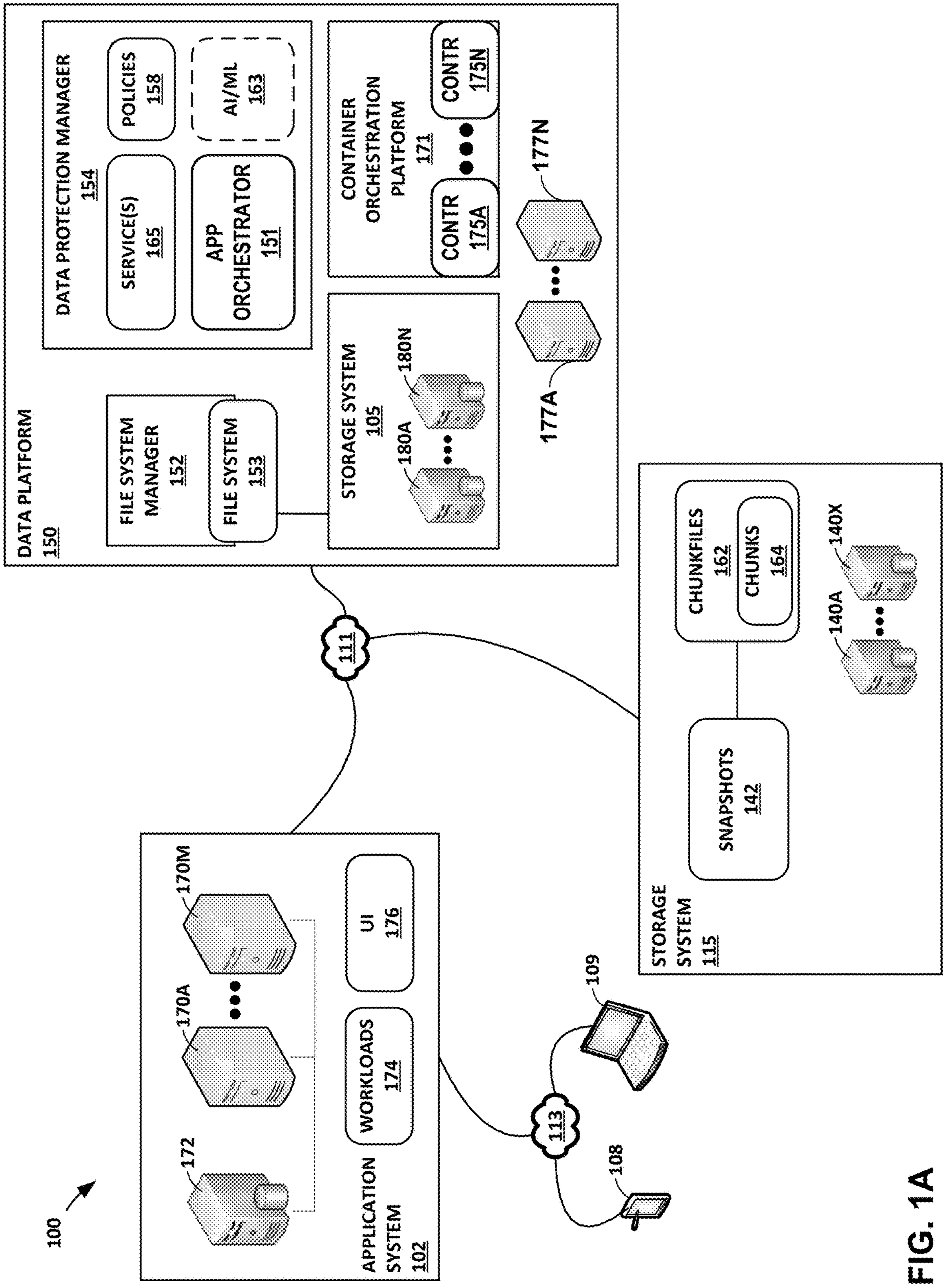
FIGS. 1A-1B are block diagrams illustrating example systems configured to support execution of multi-cluster management in accordance with one or more aspects of the techniques described in this disclosure.
Figure 1B:
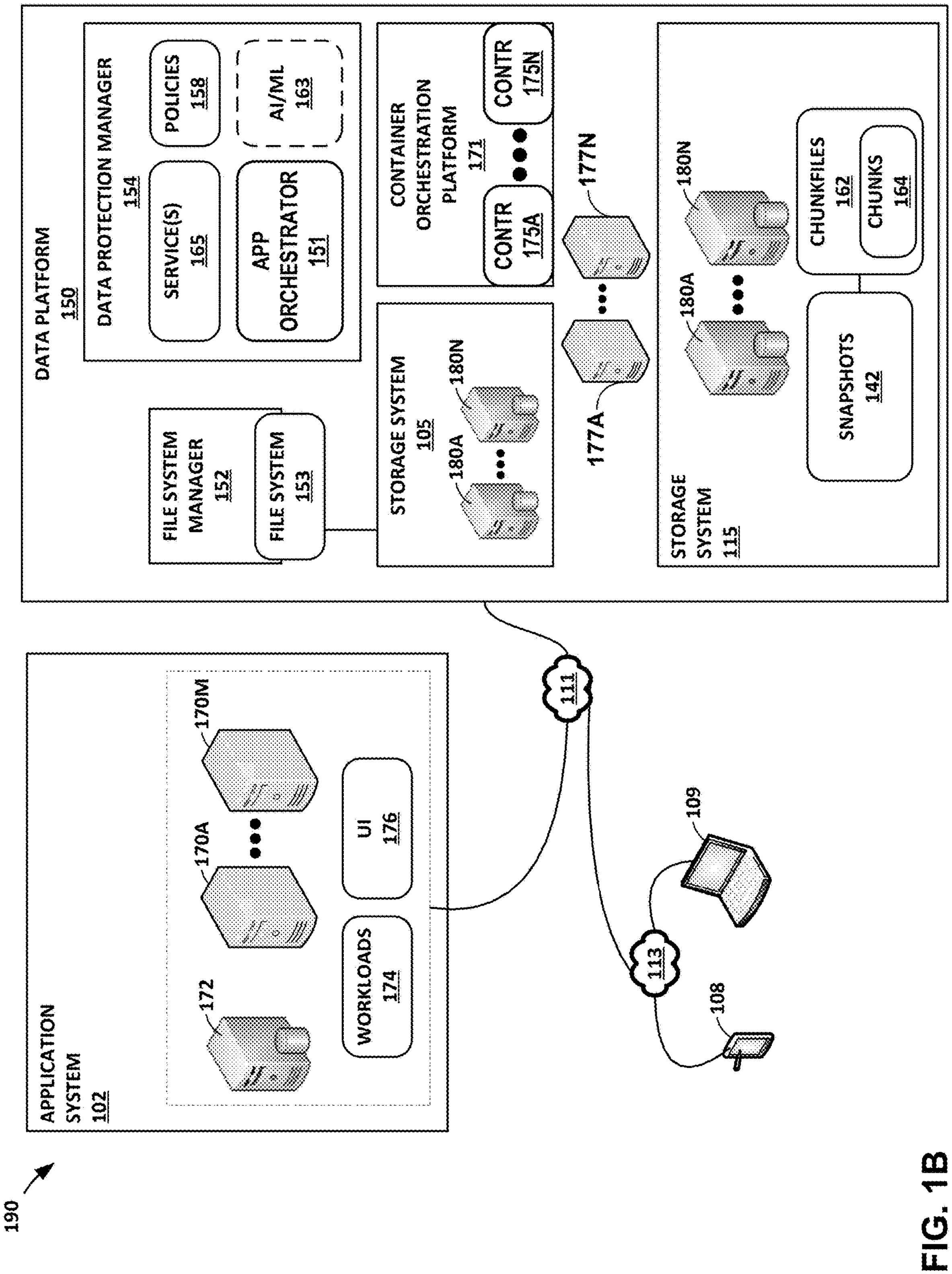

FIGS. 1A-1B are block diagrams illustrating example systems configured to support execution of an perform multi-cluster management, in accordance with one or more aspects of the techniques described in this disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, container workloads (such as Kubernetes pods) each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.).

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 111 or network 113 may include one or more network hubs, network switches, network routers, satellite dishes, or any other network equipment.

Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 111 and/or network 113 using one or more network links. The links coupling such devices or systems to network 111 and/or network 113 may be Ethernet, Asynchronous Transfer Mode (ATM) or other types of network connections, and such connections may be wireless and/or wired connections. One or more of the devices or systems illustrated in FIG. 1A-1B or otherwise on network 111 and/or network 113 may be in a local location and/or a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure. Objects that are stored may include files, virtual machines, databases, applications, pods, containers, container workloads, any of workloads 174, system images, directory information, or other types of objects used by application system 102. Objects of different types and objects of a same type may be deduplicated with respect to one another.

Data platform 150 includes data protection manager 154 that provides backups of file system data for file system 153. In the example of system 100, data protection manager 154 stores one or more backups or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup, snapshot, and archive. In general, a file system backup or snapshot 142 is a copy of file system 153 to support protection of file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies 158 that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores backups of file system data to storage system 115 as snapshots 142, using chunkfiles 162. Data protection manager 154 may use any of snapshots 142 to subsequently restore the file system (or portion thereof) to its state at the snapshot creation time, or the snapshot may be used to create or present a new file system (or "view") based on the snapshot, for instance. As noted above, data protection manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Data protection manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 kB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as a tree data structure. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

An end user or application associated with application system 102 may have access (e.g., read or write) to data that is stored in storage system 115. The end user or application may delete some of the data due to a malicious attack (e.g., virus, ransomware, etc.), a rogue or malicious administrator, and/or human error. The user's credentials may be compromised and as a result, the data that is stored in storage system 115 may be subject to ransomware. To reduce the likelihood of accidental or malicious data deletion or corruption, a data lock having a data lock period may be applied to a snapshot.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes data protection manager 154 that supports archiving of data in the form of chunkfiles 162, which interface with snapshot storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

In addition, data protection manager 154 may represent a control plane of data platform 150 that applies services in the form of one or more microservices 165 ("microservices 165") that analyze file system 153, snapshots 142, etc. to identify security breaches, provide analysis, perform backups and/or archiving, etc. in support of execution of data platform 150. In some implementations, data protection manager 154 may have different code paths based on the underlying architecture of the computing devices. For example, in so-called "dark sites" in which data platform 150 is executed on customer premises, there may be a separate code path that diverges from the code path used when data platform 150 is executed as software as a service ("SaaS"), as shown in the example of FIG. 1A. These on-premises version of data platform 150 (which is shown in the example of FIG. 1B and discussed in more detail below) may execute on a single node within the customer's hardware, which may result in low availability should the underlying node fail, experience network connectivity issues, etc.

Further, the divergent code paths may slow development of data platform 150 (e.g., feature expansion due to having two divergent code paths that need to be updated) and present difficulties in installation (as data platform 150 may require detailed knowledge of the underlying architecture of the one or more computing devices) and redeployment in the event of node failure (and/or network connectivity issues). Such detail knowledge may prevent implementation of a data platform in dark sites as a result of such sites being restricted for use only be the organization that hosts the dark sites, thereby potentially preventing any access or in some instances limited access to the SaaS version of data platform 150 shown in the example of FIG. 1A. As a result, the organization requires an administrator with detailed knowledge of container orchestration platform 171 and data protection manager 154, which may be uncommon and require detailed training of existing administrators within the organization.

In accordance with various aspects of the techniques described in this disclosure, data protection manager 154 may include an application orchestrator 151 ("app orchestrator 151"), which may represent a module that effectively abstracts installation of data protection manager 154 regardless of the underlying architecture of the one or more computing devices (e.g., compute nodes 177A-177N, which may be referred to as "compute nodes 177") on which data protection manager 154 executes. In the example of FIG. 1A, data protection manager 154 may first invoke app orchestrator 151, which may obtain an indication of the underlying architecture of the one or more computing devices (which in some instances may form a compute cluster) executing data platform 150. Compute clusters 177 is shown as physical devices in the example of FIG. 1, but may refer to virtual compute clusters 177 in the form of one or more virtual machines executing on a physical computing device (e.g., a dedicate appliance, or a general purpose computer). Computing devices 177 may, in other words, be physical computing devices (e.g., one or more of laptop computers, desktop computers, servers, network appliances, etc.) or virtual computing devices (e.g., virtual machines, virtual servers, virtual network appliances, etc.). App orchestrator 151 may deploy, based on the indication of the underlying architecture of one or more computing devices 177 supporting execution of data platform 150, one or more services 165 (which may refer to as microservices 165, where such microservices 165 may also be referred to as services 165) within container orchestration platform 171.

In the SaaS version of data platform 150 shown in the example of FIG. 1A, the indication of the underlying architecture of computing devices 177 supporting execution of data platform 150 may indicate that the underlying architecture is a public or private cloud-based architecture, possibly along with the vendor or type of public or private cloud-based architecture (e.g., Amazon AWS, IBM cloud, Microsoft Azure, Google Cloud Platform-GCP, etc.). Depending on the indication of the underlying architecture of compute clusters 177, app orchestrator 151 may identify a subset of services 165 (where the term "subset" is not used in the strict mathematical way, but may refer to one or more, up to all of services 165), adding any services 165 that may not be natively provided by the identified type of public or private cloud-based architecture.

In some examples, the underlying public or private cloud-based architecture may provide container orchestration platform 171 natively, but may not support a full suite of container management services, such as MongoDB, Postgres, and/or other management, monitoring, storage, and/or other tools and services. App orchestrator 151 may determine a sequence by which these unsupported services are to be added in order to enable container orchestration platform 171 to provide the full suite of services on which data protection manager 154 may rely to provide comprehensive management, monitoring, review, and reporting (both to app orchestrator 151 during the lifecycle of services 165 and to administrators via a user interface, which is not shown in the example of FIG. 1A). Data protection manager 154 may interface with container orchestration platform 171 to automatically configure each of deployed subset of services 165, which are deployed as containers 175A-175N ("contr 175A" through "contr 175N," and may be referred to collectively as "containers 175") to define dependencies between containers 175 (such as configuring containers 175 into pods of one or more of containers 175, and sidecar pods of one or more dependent or related containers 175).

In operation, data platform 150 may execute a container orchestration platform 171 that configures one or more compute nodes 177to execute one or more containers 175. Data platform 150 (which is representative of one or more computing device 177) may execute one or more containers 175 within container orchestration platform 171 to implement an application orchestrator 151 that interfaces with container orchestration platform 171 to automatically manage deployment of a plurality of services 165 forming a control plane of data platform 150. App orchestrator 151 may next obtain an indication of an underlying architecture of one or more compute nodes 177 (e.g., forming a compute cluster, which may therefore be referred to as compute cluster 177), where such indication may indicate that the underlying architecture is one or more of an on-premises appliance (e.g., within a dark site), a private cloud, and a software as a service (SaaS) public cloud architecture. This indication of the underlying architecture may be manually input (e.g., by an administrator of application system 102) via a user interface (e.g., user interface 176) and/or derived through analysis of data platform 150. App orchestrator 151 may then automatically deploy (e.g., with little to no human intervention other than possibly providing authentication and/or authorization data) and based on the indication of the underlying architecture of one or more computing devices 177, the plurality of services 165 forming the control plane as one or more containers 175 within container orchestration platform 171.

In some examples, app orchestrator 151 and/or data protection manager 154 may invoke artificial intelligence and/or machine learning ("AI/ML") model 163 (shown in the example of FIG. 1A as "AI/ML 163") may represent one or more statistical models, one or more artificial intelligence (AI) models, and/or one or more ML models trained on training data and/or the client data (e.g., the data stored by the third-party service provider on behalf of the client and/or metadata). There are a number of different statistical models, including a seasonal autoregressive integrated moving average (SARIMA) model, an autoregressive moving average (ARMA) model, a moving average (MA) model or any other time series model.

Artificial intelligence (AI) generally refers to a way by which autonomous devices operate to identify decisions responsive to changing observed state. AI models may utilize machine learning (ML), which typically involves training a machine learning model with training data to produce a trained model able to generalize properties of data based on similar patterns with the training data. Training the model may involve learning model parameters by optimizing an objective function, thus optimizing a likelihood of observing the training data given the model.

AI/ML models 163 may include any number of different types of machine learning models, such as neural networks, deep neural networks, dense neural networks, large language models, and the like. Although described with respect to machine learning models, the techniques described in this disclosure are also applicable to other types of AI models, including rule-based models, finite state machines, and the like.

Machine learning may generally enable a computing device to analyze input data and identify an action to be performed responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training.

App orchestrator 151 may invoke one or more AI/ML models 163 to process metrics and events issued by container orchestration platform 171 to modify or adapt pods (e.g., vai horizontal scaling) to add or decrease the number of pods to potentially find an optimal number of pods possibly within a lower threshold (e.g., 2) and an upper threshold (e.g., 10). Data protection manager 154 may also invoke one or more AI/ML models 163 to provide analysis of time series data and thereby present reports and/or recommendations (possibly via a large language model, which outputs natural language recommendations) with respect to security threats, efficiency, business analysis, etc. More information regarding execution of AI/ML models 163 for generating reports and/or recommendations can be found in U.S. application Ser. No. 18/780,173, entitled "AUTOMATED WORKLOAD SIZER FOR DATA PLATFORM SERVICE," filed Jul. 22, 2024, the entire contents of which are hereby incorporated by reference.

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by data protection manager 154 for initially storing and accumulating chunks prior to storage at storage system 115. Data protection manager 154 may store tree data comprising nodes with references (e.g., pointers) to one or more chunks 164 at storage system 115. Though not shown, data protection manager 154 may store the tree data and checksums at storage system 105 in addition to or instead of storage system 115, regardless of whether or not storage system 115 is remote or local to data platform 150, in some examples.

As further shown in the example of FIG. 1B, application system 102 represents a so-called dark site that limits or prevents access from outside of application system 102, possibly for regulatory or privacy purposes (e.g., financial information, personal identification information, health data, etc.). As such, application system 102 may be unable to execute SaaS version of data platform 150 and instead may rely on on-premises execution of data platform 150. As a result, data platform 150 also performs multi-cloud management (MCM) in order to enable execution of the control plane of data platform 150, which is represented by data protection manager 154.

However, traditional multi-cluster management (MCM) solutions for dark sites may face significant challenges in scalability and high availability. Traditional MCMs are mostly confined to single-node deployments, which limits their ability to efficiently manage high scale cluster environments. The traditional MCM solutions are also mostly hardware independent and need different design and architecture across various form factors making traditional MCMs potentially less maintainable and error prone.

According to various aspects of the techniques described in this disclosure, a unified MCM (which is represented by data protection manager 154 in the example of FIGS. 1A and 1B, and as such may be referred to as "unified MCM 154") is provided that may address scalability and high-availability limitations by providing a unified, highly scalable platform with a Single Pane of Glass interface, adaptable to multiple form factors. Unified MCM 154 may provide an application orchestrator service 151 (which may be referred to as "app orchestrator 151"), which may automate the deployment of a data platform control plane for images across various environments. Unified MCM 154 may allow operation on any qualified hardware (including HP, UCS, and clusters) or in customer-managed cloud environments without potentially requiring architectural changes. This approach may ensure reliable management of numerous clusters, independent of the underlying infrastructure.

Various aspects of the techniques may not only address the pain points of traditional MCM solutions but also paves the way for potentially effortless, resilient, and scalable data platform control plane deployments (shown as data protection manager 154 in the example of FIG. 1B) across a wide range of environments. Unified MCM 154 may change how enterprises manage and scale their operations particularly in dark site environments, such as system 190 shown in the example of FIG. 1B.

The proposed implementation may enable high availability by implementing data replication across multiple nodes (e.g., compute nodes 177). Using streaming replication, data platform 150 ensures that data remains synchronized across all replicas at any given time. Unlike the current MCM version, which lacks data replication and potentially results in downtime when a node fails, unified MCM 154 may attempt to ensure continuous operation and enhanced reliability.

That is, the indication of the underlying architecture may indicate that the underlying architecture is an on-premises appliance and/or a dark site environment. On-premises appliances may refer to a dedicated data platform 150 configured to be installed local to application system 102 in order to provide a dedicated data platform 150 executed exclusively for application system 102 without any control by entities outside of application system 102. As a result, administrators and other personnel of application system 102 are tasked with independent management and monitoring of data platform 150.

In this instance, app orchestrator 151 may be configured to automatically deploy, based on the indication that the underlying architecture is an on-premises appliance, multiple instances of each of the plurality of services forming the control plane of data platform 150 (e.g., data protection manager 154) as replicated containers 175 within two or more different nodes supporting container orchestration platform 171, wherein the two or more different nodes may include one or more computing devices 177. App orchestrator 151 may next configure high availability between replicated containers 175 by, at least in part, configuring data replication between replicated containers 175.

For example, app orchestrator 151 may configure container 175A as a primary container and configure a replicated container 175B as a secondary container. App orchestrator 151 may configure data replication from container 175A to replicated container 175B, thereby providing high availability because data replication ensures data stored to container 175A is also mirrored to replicated container 175B (configured to operate on a different node within container orchestration platform 171) within some specified time of delivery otherwise the mirrored data is resent. Should container 175A fail (e.g., due to hardware failure, network connectivity issues, software failure, malicious attacks, etc.), app orchestrator 151 may, via the above noted even monitoring, determine a failover event has occurred, selecting to move execution from container 175A to container 175B, which may nearly immediately come online and begin executing one or more of microservices 165 previously assigned to container 175A. App orchestrator 151 may also (possibly based on node-level metrics, as discussed above) select a new secondary container 175C or some other one of containers 175 executing on a different node (e.g., compute node 177N) from container 175B, thereby maintaining high availability should the node (e.g., compute node 177A) executing container 175B fail.

In this way, by leveraging operators of container orchestration platform 171, unified MCM 154 may provide self-healing functionality by intelligently failing over stateful set pods to alternative nodes when issues are detected. App orchestrator 151 may actively monitor node-related events output by container orchestration platform 171 and determine a potentially optimal node for restarting failed pods, and possibly ensures both replica integrity and data consistency on secondary nodes. Additionally, unified MCM 154 may preserve primary/secondary configurations, an enhancement over the traditional MCM solutions, which may not include self-healing mechanisms.

In other words, app orchestrator 151 may obtain, from container orchestration platform 171, node-related events indicative of a state of a plurality of nodes supporting execution of containers 175 within container orchestration platform 171. App orchestrator 151 may then determine one or more impacted services 165 of the plurality of services that were affected by the node-related event. App orchestrator 151 may obtain, from container orchestration platform 171, metrics regarding each remaining node of a plurality of nodes 177 not impacted by the event. Based on the metrics, app orchestrator 151 may determine a failover node (e.g., compute node 177N) from the remaining nodes (e.g., compute nodes 177A-177M), and automatically redeploy the one or more impact services 165 on the failover node as one or more failover containers 175 within container orchestration platform 171.

Further, app orchestrator 151 may obtain, from container orchestration platform 171, metrics concerning one or more nodes 177 supporting execution of containers 175 within container orchestration platform 171, the one or more nodes including the one or more computing devices 177. App orchestrator 151 may adjust deployment, based on the metrics, of at least one of the plurality of containers 175 across the one or more nodes.

In this way, various aspect of the techniques described in this disclosure may introduce a framework to continuously or periodically monitor the health of control plane services 165 and takes proactive or reactive measures to ensure uninterrupted availability from an application perspective. Unified MCM 154 may take intelligent and proactive actions based on the metrics collected from the system. This approach may contrast with the traditional MCM solution, which may lack such continuous monitoring and decision-making capabilities, leading to potential disruptions in service.

As described above with respect to the example of FIG. 1A, app orchestrator 151 may automate the deployment of data platform control plane images across varied architectures. App orchestrator 151 may provide a framework to control bring-up sequence and dependency management between various control plane images including overrides. The unified architecture may ensure that data protection manager 154 can be executed on any qualified hardware (including HP, Cisco UCS servers apart from clusters), possibly without any architectural changes. This also helps to deploy the same across various form factors including appliance form factor, virtual private cloud (VPC) form factor, IBM cloud etc.

As such, app orchestrator 151 may automatically identify, based on the indication of underlying architecture, the plurality of services from a plurality of available services 165 having more services than the plurality of services. App orchestrator 151 may be configured to determine a deployment sequence for the plurality of services 165 and dependencies between the plurality of services 165, including dependency overrides that override the dependencies between the plurality of services 165. App orchestrator 151 may also automatically deploy the plurality of services 165 according to the deployment sequence and configuring the dependencies between the plurality of services 165 including dependency overrides.

In instances where container orchestration platform 171 includes a pod-based container orchestration platform (e.g., Kubernetes) in which containers 175 are arranged into one or more pods, app orchestrator may automatically deploy, based on the indication of the underlying architecture of the one or more computing devices, the plurality of services 165 the plurality of services 165 forming control plane 154 as one or more containers 175 within container orchestration platform 171 according to a single unified container deployment chart, which in the context of Kubernetes may refer to a Helm chart.

Stated differently, various aspects of the techniques may provide a unified chart and codebase for deploying data platform control plane images across various form factors including Appliance, VPC, IBM Cloud etc. This unified model may replace the fragmented approach which relies on separate charts and modified code for different services. The unified approach may support feature-based development, potentially enhancing deployment flexibility and consistency across environments.

One aspect of app orchestrator 151 that enables feature-based development over environment-based development may involve the abstraction provided by Kubernetes or other pod-based container orchestration platforms. That is, Kubernetes exposes a hypertext transfer protocol (HTTP) based application programming interface (API) server that serves as a primary interface for interacting with a network cluster (formed, for example, of virtual servers and/or physical servers). Kubernetes may expose pods as "services" via a cluster IP address and/or a domain name service (DNS) name, which data protection manager 154 may use to communicate with the pods. As such, services within Kubernetes are uniformly exposed as a cluster IP address and/or a DNS name regardless of the underlying architecture. App orchestrator 151 may leverage this abstraction to identify, based on the underlying architecture of the one or more computing devices, a subset of services 165 that are to be installed in a given sequence along with any dependencies between containers 175, establishing a primary pod and sidecar pods that operate in conjunction and thereby support execution of the primary pod. Although "pod" is a Kubernetes specific term for a container workload deployed using a Kubernetes container orchestration system, as used herein, "pod" may be used to refer to any type of container workload, i.e., a container deployment unit for deploying and managing groups of one or more containers across compute nodes.

In dark sites in which a network appliance implements data platform 150, Kubernetes may create multiple "nodes,"

which in this instance may refer to multiple virtual machines executing within the appliance. This may enable the high availability in terms of offering nearly seamless transition of service execution should a node experience hardware (of the allocated resources of the network appliance dedicated to a particular node), connectivity, and/or software failure. When a node fails, Kubernetes may automatically failover to a secondary node, which app orchestrator 151 may configure in support of high availability.

In the context of Kubernetes, a Helm chart may refer to a package manager for Kubernetes applications. Such Helm charts may simplify the deployment, management, and scaling of Kubernetes resources by providing a structured way to define, configure, and deploy these resources as reusable, versioned packages. Helm is sometimes referred to as "the Kubernetes package manager," and Helm Charts are the packages Kubernetes uses.

A Helm chart may include the following:

1) Chart.yaml (where "yaml" refers to yet another markup language): A metadata file describing the Helm Chart, including its name, version, description, and dependencies.
2) Values.yaml: A file containing default configurations for the chart, which can be overridden by custom values during deployment.
3) Templates Directory: Contains YAML templates for Kubernetes resources (e.g., Deployments, Services, ConfigMaps) that are rendered using the values provided in Values.yaml.
4) Charts Directory: Optional. Includes sub-charts, or dependencies required by the parent chart.
5) README.md: Documentation providing an overview of the chart, usage instructions, and additional notes.
6) NOTES.txt: Provides additional information or instructions displayed after deploying the chart.

Helm Charts may allow you to deploy complex Kubernetes applications with a single command. For Example, instead of manually writing multiple kubectl apply commands, app orchestrator 151 may use helm install. Helm Charts are reusable across environments and can be parameterized for different configurations. Helm Charts may also be versioned, enabling easy rollbacks to previous deployments if needed. Helm charts may also ensure that deployments are consistent across teams and environments. All the Kubernetes resources required by data protection manager 154 may be specified in a single Helm chart.

In this way, the techniques of this disclosure may provide one or more technical advantages that realize one or more practical applications. The unified multi-cloud manager (which may be represented by data protection manager 154) may automatically identify and configure resources (e.g., ports, memory, processing capacity, etc.) to support execution of data platform 150 along with unified multi-cluster manager 154 regardless of the underlying architecture of one or more computing devices 177 executing data platform 150. The unified multi-cluster manager may simplify deployment compared to multi-cluster managers (MCMs) developed for a specific network architecture in that unified multi-cluster manager 154 may automatically identify, install, and configure the resources required for unified multi-cluster manager 154 regardless of the underlying network architecture. Rather than resort to execution of the multi-cloud manager by a single node (which may fail and thereby prevent execution of the multi-cluster manager), unified multi-cluster manager 154 may provide data streams to synchronize data between nodes used to execute unified multi-cluster manager 154 (which may also be referred to as "data synchronization"), enabling high availability and/or fault tolerance within the underlying nodes regardless of the network cluster architecture. The unified multi-cluster manager may also manage redeployment automatically between nodes when one or more nodes fail, leave the network cluster, or experience network connectivity issues.

As a result, one or more of the following are enabled by various aspects of the techniques described in this disclosure:

1) Unified MCM 154 provides a set of abstractions so that data platform 150 can be deployed seamlessly across different form factors/architectures. Unified MCM 154 may use feature based development in favor of environment based development.
2) Unified helm charts for all services so that data platform 150 can be deployed across different form factors/architectures with ease.
3) App Orchestrator service 151 to manage the lifecycle of these services 165. App orchestrator service 151 may continuously monitor the health of services 165 and reconciles services 151 so that a defined number of pods are always running. App orchestrator 151 may communicate to cluster services 151 and may take into account their input to make decisions.
4) Unified MCM 154 may rely on watching container orchestration platform events to make decisions for pods. An example is Horizontal pod scaling, where unified MCM 154 obtains different metrics provided by container orchestration platform 171 to scale the pods up and down.
5) Unified MCM 154 may enable data replication across multiple nodes to achieve high availability and fault tolerance. Unified MCM 154 may ensure that data across nodes are in sync so that data platform 150 can recover quickly from node failures.

Figure 2:
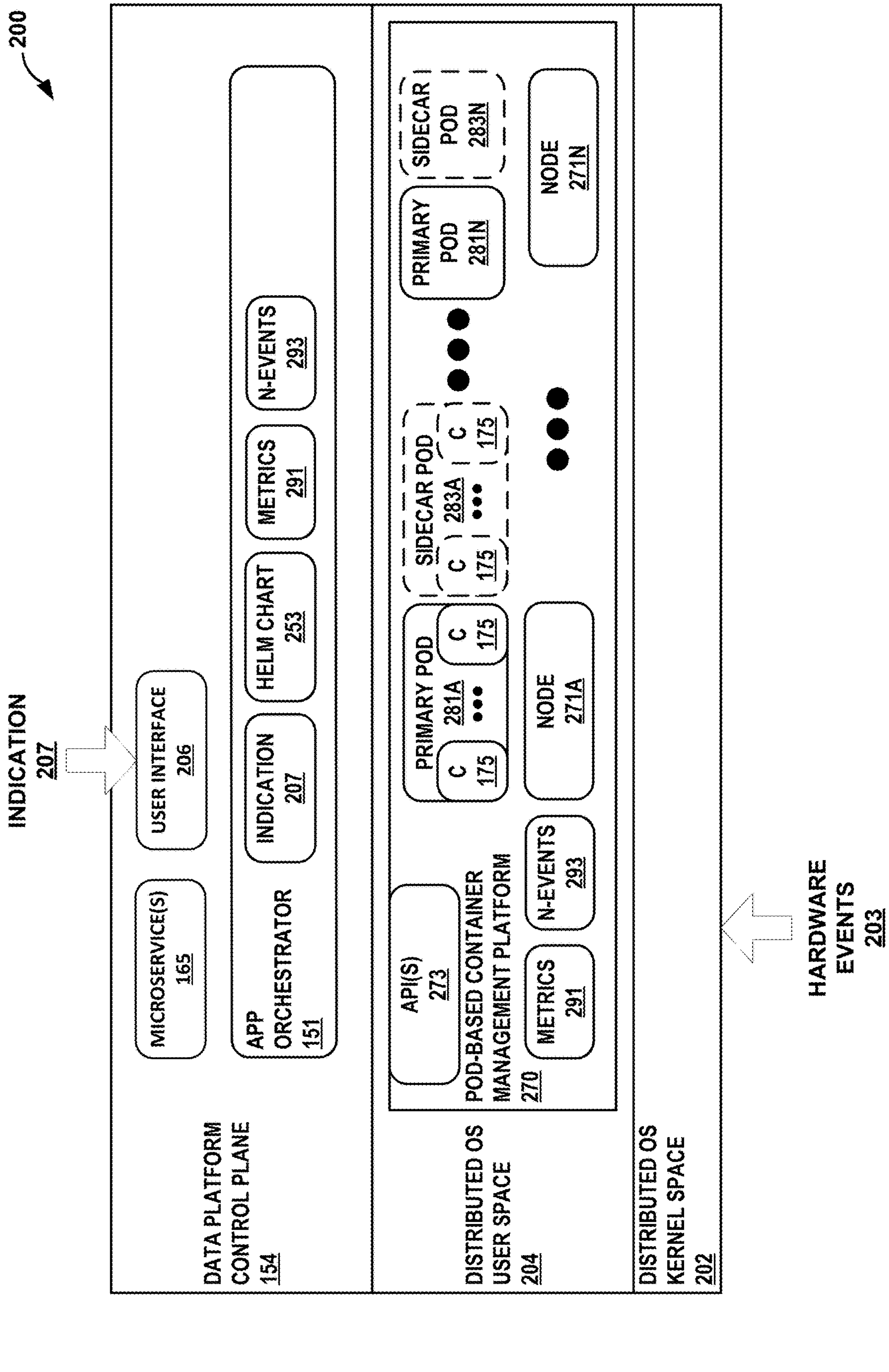
FIG. 2 is a block diagram illustrating a software architecture in which deployment of services for a control plane of a data platform operates in conjunction with a container management platform in accordance with various aspects of the techniques described in this disclosure.

FIG. 2 is a block diagram illustrating a software architecture in which deployment of services for a control plane of a data platform operates in conjunction with a pod-based container management platform in accordance with various aspects of the techniques described in this disclosure. In the example of FIG. 2, software architecture 200 includes a distributed operating system (OS) kernel space 202, a distributed operating system user space 204, and a data platform control plane 154 (which may also be referred to as data protection manager 154 as shown in the examples of FIGS. 1A and 1B).

A distributed operating system (DOS) may refer to a type of operating system that manages a group of interconnected, independent computers (nodes) as if they were a single cohesive system. The DOS may provide a unified interface and abstracts the complexities of underlying hardware and network communication, enabling users and applications to interact with the system nearly seamlessly. A DOS kernel provides an interface with which to interact with the underlying hardware of each physical computing device. Generally, a DOS kernel space, such as DOS kernel space 202, has no restrictions or very limited restrictions for interacting with the underlying hardware and exposes one or more APIs to allow DOS user space 204 to interact with DOS kernel space 202 in a controlled and possibly authorized manner. DOS user space 204 may have limited access to the underlying hardware 202 via the APIs exposed by DOS kernel space 202.

DOS kernel space 202 may receive hardware events 203, such as hardware and/or timing interrupts, input/output (I/O) events, network events, processor events, memory events, power and thermal events, hardware faults and errors, etc.

DOS kernel space 202 may pass hardware events 203 to DOS user space 204, which may direct the events to pod-based container management platform 270 (which represents an example of container management platform 171 shown in the example of FIGS. 1A and 1B) executing within DOS user space 204 when such hardware events 203 relate to pod-based container management platform 270.

Pod-based container management platform 270 may represent Kubernetes or any other pod-based container management platform. Pod-based container management platform 270 may maintain a logical abstraction shown as nodes 271A-271N ("nodes 271"), each of which represents either a physical machine or a virtual machine. This abstraction allows for a uniform execution of pods, such as primary pods 281A-281N ("primary pods 281") and possibly one or more sidecar pods 283A-283N ("sidecar pods 283"). As noted above, primary pods 281 may each execute one or more containers 175, while sidecar pods 283 may execute one or more containers 175 providing services that support execution of primary pods 281.

Pod-based container management platform 270 may maintain metrics 291 and node events 293 (shown as "n-events 293" in the example of FIG. 2). Metrics 291 may include node metrics for one or more nodes 271, such as central processing unit (CPU) usage, memory usage, and disk usage. Metrics 291 may also include pod metrics, such as CPU and memory, restart counts, and pod availability. In addition, metrics 291 may include cluster-wide metrics, such as total resource utilization, number of pods, deployments and services, and API service request latency. N-events 293 may include hardware events 203 that impact one or more of nodes 271, where pod-based container management platform 270 may determine which of nodes 271 are impacted by hardware events 203 to generate n-events 293.

Pod-based container management platform 270 may include APIs 273, which expose an interface to deploy services 165 within pod-based container management platform 270, monitor the lifecycle of pods 281/283 and containers 175, obtain a portion or all of metrics 291 and/or n-events 293, and otherwise interact with pod-based container management platform 270. Data platform control plane 154 may invoke app orchestrator 151 to configure and manage a lifecycle of data platform control plane 154 as it relates to execution of services 165. App orchestrator 151 may invoke one or more functions of APIs 273 to deploy microservices 165 within pod-based container management platform 270 as one or more containers 175 arranged into pods 281/283.

Data platform control plane (DPCP) 154 may include user interface 206 that may present a graphical, command line, or other user interface with which an administrator or other user may interact to provide input and review outputs. User interface 206 may prompt a user for an indication 207 of the underlying hardware architecture, which is passed to app orchestrator 151 by user interface 206. Alternatively, app orchestrator 151 may analyze software architecture 200 to obtain indication 207, or otherwise obtain indication 207 of the underlying architecture.

In any event, based on indication 207, app orchestrator 151 may select one or more of services 165 and deploy services 165 according to Helm chart 253. App orchestrator 151 may invoke one or more functions and/or commands present in APIs 273 to load helm chart 253, which may effectively configure the execution of services 165 as containers 175 within pods 281/283. As noted above, based on indication 207 identifying a network appliance as the underlying architecture, app orchestrator 151 may configure data replication (in which data is replicated between two of pods 281/283 executed by different nodes 271) to provide high availability.

As further noted above, app orchestrator 151 may interface with pod-based management platform 270 to obtain all or some portion of metrics 291 and n-events 293. Based on either or both of metrics 291 and n-events 293, app orchestrator 151 may monitor and proactively adjust deployment of containers 175 and/or pods 281/283. Moreover, based on either or both of metrics 291 and n-events 293, app orchestrator 151 may scale up or down a number of nodes 171, possibly redeploying services 165 as containers 175 within pods 281/283 according to helm chart 253 or other programmable logic of app orchestrator 151.

In this respect, app orchestrator 151 may act as a central control plane for deploying services 165 within pod-based container management platform 270 regardless of the underlying architecture (as such architecture is abstracted away from the underlying architecture by pod-based container management platform 270), while also monitoring and adapting deployment of services 165 within pod-based container management platform 270 throughout the lifecycle of each of services 165. App orchestrator 151 may, in addition, manage the execution environment (e.g., pod-based container management platform 270) to scale nodes 271 in a way that may optimize execution of pods 281/283 in terms of metrics 291 and n-events 293. This overall approach to full lifecycle management of services 165 may alleviate burden on administrators of software architecture 200 which in certain circumstances (such as dark sites where outside access may be prohibited) may provide a much better user experience over traditional MCM systems. This better user experience in which app orchestrator 151 may handle nearly all deployment, monitoring, and proactive and reactive responses to such monitoring, may result in significant time and cost savings, while also promoting more efficient use of computing resources (e.g., given that users may not inadvertently misconfigure pod-based container management platform, resulting in wasted resources, possible down time, etc.).

Figure 3:
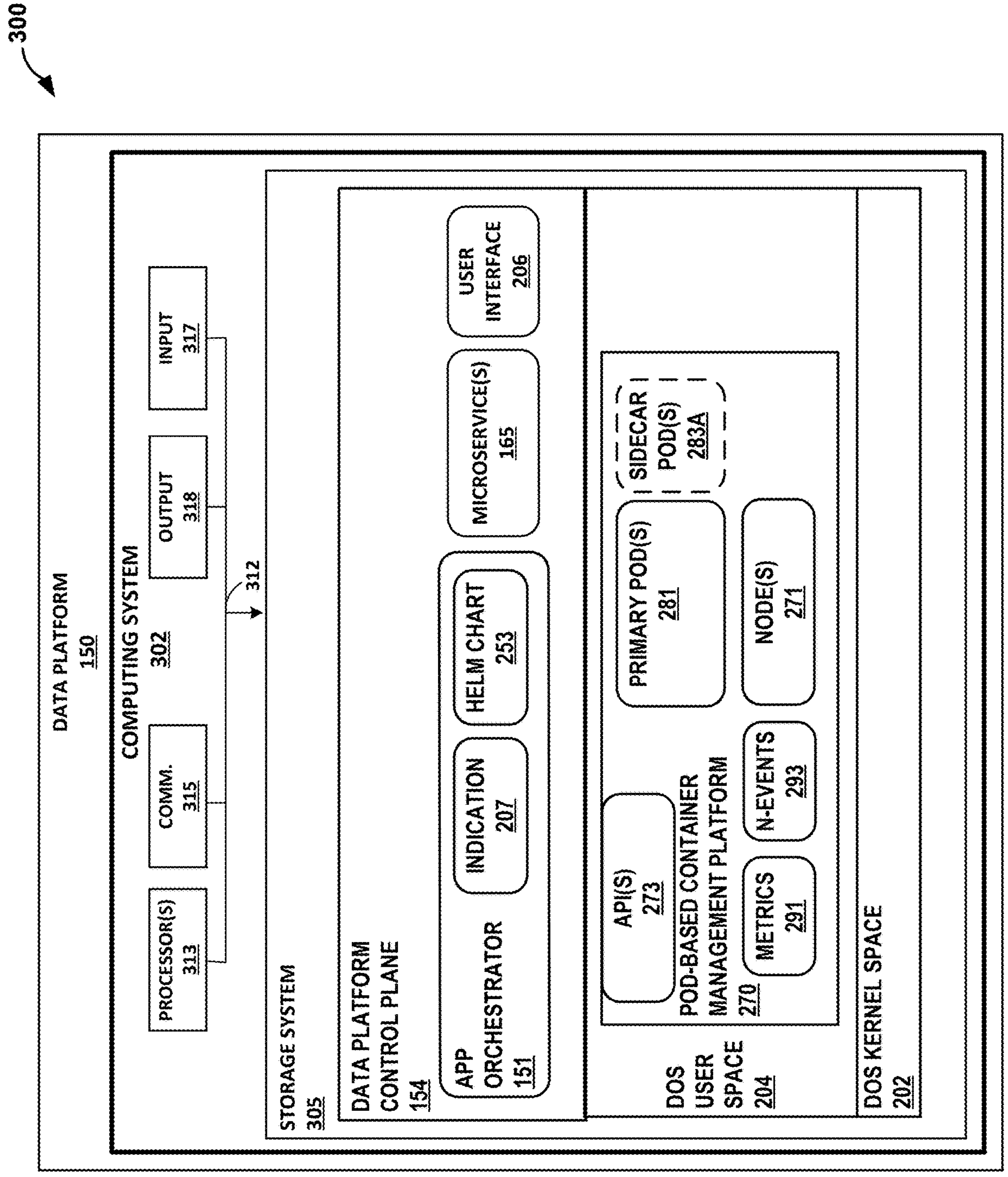
FIG. 3 is a block diagram illustrating an example of a computing system that implements data management platform 150, in accordance with techniques of this disclosure.

FIG. 3 is a block diagram illustrating an example of a computing system that implements data management platform 150, in accordance with techniques of this disclosure. Computing system 302 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 302 represents a cloud computing system, server farm, and/or server cluster (or portion thereof) that provides services to other devices or systems. In other examples, computing system 302 may represent or be implemented through one or more virtualized compute instances (e.g., virtual machines, containers) of a cloud computing system, server farm, data center, and/or server cluster.

In the example of FIG. 3, computing system 302 may include one or more communication units 315, one or more input devices 317, one or more output devices 318, and one or more storage devices of storage system 305. Storage system 305 also includes the modules and/or units shown as architecture 200 in the example of FIG. 2 (e.g., data platform control plane 154, DOS user space 204, and DOS kernel space 202). One or more of the devices, modules, storage areas, or other components of computing system 302 may be interconnected to enable inter-component communications (physically, communicatively, and/or operatively). In some examples, such connectivity may be provided by communication channels (e.g., communication channels 312), which may represent one or more of a system bus, a network connection, an inter-process communication data structure, or any other method for communicating data.

One or more processors 313 of computing system 302 may implement functionality and/or execute instructions associated with computing system 302 or associated with one or more modules illustrated herein and/or described below, including data platform control plane 154 (as well as app orchestrator 151, services 165, and user interface 206), DOS user space 204 (including pod-based container management platform 270), and DOS kernel space 202. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 302 may use one or more processors 313 to perform operations in accordance with one or more aspects of the present disclosure using software, hardware, firmware, or a mixture of hardware, software, and firmware residing in and/or executing at computing system 202.

One or more communication units 315 of computing system 302 may communicate with devices external to computing system 302 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 302 may transmit and/or receive satellite signals on a satellite network. Examples of communication units 315 include a network interface card (e.g., such as an Ethernet card), an optical transceiver, a radio frequency transceiver, a GPS receiver, or any other type of device that can send and/or receive information. Other examples of communication units 315 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 317 may represent any input devices of computing system 302 not otherwise separately described herein. Input devices 317 may generate, receive, and/or process input. For example, one or more input devices 317 may generate or receive input from a network, a user input device, or any other type of device for detecting input from a human or machine.

One or more output devices 318 may represent any output devices of computing system 202 not otherwise separately described herein. Output devices 318 may generate, present, and/or process output. For example, one or more output devices 318 may generate, present, and/or process output in any form. Output devices 318 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 305 within computing system 302 may store information for processing during operation of computing system 302. Storage devices may store program instructions and/or data associated with one or more of the modules described in accordance with one or more aspects of this disclosure. One or more processors 313 and one or more storage devices may provide an operating environment or platform for such modules, which may be implemented as software, but may in some examples include any combination of hardware, firmware, and software. One or more processors 313 may execute instructions and one or more storage devices of storage system 305 may store instructions and/or data of one or more modules. The combination of processors 313 and storage system 305 may retrieve, store, and/or execute the instructions and/or data of one or more applications, modules, or software. Processors 313 and/or storage devices of storage system 305 may also be operably coupled to one or more other software and/or hardware components, including, but not limited to, one or more of the components of computing system 302 and/or one or more devices or systems illustrated as being connected to computing system 302.

Figure 4:
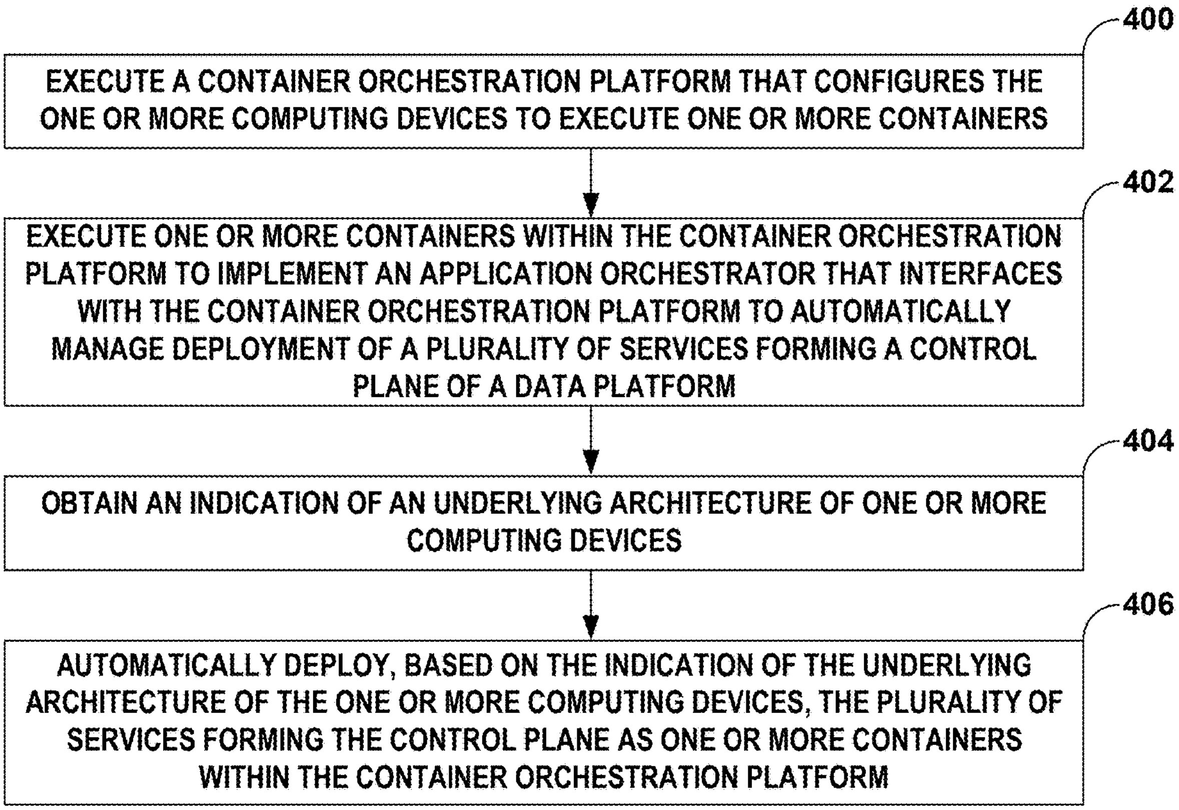
FIG. 4 is a flowchart illustrating example operation of the data platform in performing various aspects of the network cluster management techniques described in this disclosure. Like reference characters denote like elements throughout the text and figures.

FIG. 4 is a flowchart illustrating example operation of the data platform in performing various aspects of the network cluster management techniques described in this disclosure. Data platform 150 may first execute a container orchestration platform 171 that configures one or more computing devices 177 to execute one or more containers 175 (400). Data platform 150 (which is representative of one or more computing device) may execute one or more containers 175 within container orchestration platform 171 to implement an application orchestrator 151 that interfaces with container orchestration platform 171 to automatically manage deployment of a plurality of services 165 forming a control plane of data platform 150 (402).

App orchestrator 151 may next obtain an indication of an underlying architecture of the one or more computing devices (404), where such indication may indicate that the underlying architecture is one or more of an on-premises appliance (e.g., within a dark site), a private cloud, and a software as a service (SaaS) public cloud architecture. This indication of the underlying architecture may be manually input (e.g., by an administrator of application system 102) via a user interface and/or derived through analysis of data platform 150. App orchestrator 151 may then automatically deploy (e.g., with little to no human intervention other than possibly providing authentication and/or authorization data) and based on the indication of the underlying architecture of the one or more computing devices, the plurality of services 165 forming the control plane as one or more containers 175 within container orchestration platform 171 (406).

In this way, various aspects of the techniques may enable one or more of the following examples.

Example 1. A method comprising: executing, by one or more computing devices, a container orchestration platform that configures the one or more computing devices to execute one or more containers; executing, by the one or more computing devices, the one or more containers within the container orchestration platform to implement an application orchestrator that interfaces with the container orchestration platform to automatically manage deployment of a plurality of services forming a control plane of a data platform; obtaining, by the application orchestrator, an indication of an underlying architecture of the one or more computing devices; and automatically deploying, by the application orchestrator, and based on the indication of the underlying architecture of the one or more computing devices, the plurality of services forming the control plane as the one or more containers managed by the container orchestration platform.

Example 2. The method of example 1, wherein the indication of the underlying architecture indicates that the underlying architecture is one or more of an on-premises appliance, a private cloud, and a software as a service public cloud architecture.

Example 3. The method of any of examples 1 and 2, wherein the indication of the underlying architecture indicates that the underlying architecture is an on-premises appliance, and wherein automatically deploying the plurality of services comprises: automatically deploying, based on the indication that the underlying architecture is an on-premises appliance, multiple instances of each of the plurality of services forming the control plane of the data platform as replicated containers within two or more different nodes supporting the container orchestration platform, wherein the two or more different nodes may include the one or more computing devices; and configuring high availability between the replicated containers by, at least in part, configuring data replication between the replicated containers.

Example 4. The method of any of examples 1-3, wherein the indication of the underlying architecture indicates that the underlying architecture is an on-premises appliance, and wherein automatically deploying the plurality of services comprises: obtaining, by the application orchestrator, and from the container orchestration platform, node-related events indicative of a state of a plurality of nodes supporting execution of the one or more containers within the container orchestration platform; and determining one or more impacted services of the plurality of services that were affected by the node-related event; obtaining, from the container orchestration platform, metrics regarding each remaining node of the plurality of nodes not impacted by the event; determining, based on the metrics, a failover node from the remaining nodes; and automatically redeploying the one or more impacted services on the failover node as one or more failover containers within the container orchestration platform.

Example 5. The method of any of examples 1-4, wherein the indication of the underlying architecture indicates that the underlying architecture is an on-premises appliance, wherein automatically deploying the plurality of services comprises: obtaining, from the container orchestration platform, metrics concerning one or more nodes supporting execution of the containers within the container orchestration platform, the one or more nodes including the one or more computing devices; and adjusting deployment, based on the metrics, of at least one of the plurality of containers across the one or more nodes.

Example 6. The method of any of examples 1-5, wherein automatically deploying the plurality of services comprises: automatically identifying, based on the indication of underlying architecture, the plurality of services from a plurality of available services having more services than the plurality of services; determining a deployment sequence for the plurality of services and dependencies between the plurality of services, including dependency overrides that override the dependencies between the plurality of services; and automatically deploying the plurality of services according to the deployment sequence and configuring the dependencies between the plurality of services including dependency overrides.

Example 7. The method of any of examples 1-6, wherein the container orchestration platform includes a pod-based container orchestration platform in which the one or more containers are arranged into one or more pods, wherein automatically deploying the plurality of services comprises automatically deploying, by the application orchestrator, and based on the indication of the underlying architecture of the one or more computing devices, the plurality of services forming the control plane as one or more containers within the container orchestration platform according to a single unified container deployment chart.

Example 8. The method of any of examples 1-7, wherein the container orchestration platform includes a pod-based container orchestration platform in which the one or more containers are arranged into one or more pods, and wherein the method further comprises managing, by the application orchestrator, a lifecycle of at least one of the plurality of services through monitoring a health of the plurality of services and reconciling the plurality of services to maintain a sufficient number of the one or more pods.

Example 9. The method of any of examples 1-8, wherein the data platform executes within the container orchestration platform, and wherein the container orchestration platform executes within a user space of an operating system executed by the one or more computing devices.

Example 10. A computing system comprising: a memory configured to store a plurality of services forming a control plane of a data platform; and processing circuitry configured to: execute a container orchestration platform that configures the one or more computing devices to execute one or more containers; and execute the one or more containers managed by the container orchestration platform to implement an application orchestrator that interfaces with the container orchestration platform to automatically manage deployment of the plurality of services forming the control plane of the data platform, wherein the application orchestrator is configured to: obtain an indication of an underlying architecture of the one or more computing devices; and automatically deploy and based on the indication of the underlying architecture of the one or more computing devices, the plurality of services forming the control plane as the one or more containers managed by the container orchestration platform.

Example 11. The computing system of example 10, wherein the indication of the underlying architecture indicates that the underlying architecture is one or more of an on-premises appliance, a private cloud, and a software as a service public cloud architecture.

Example 12. The computing system of any of examples 10 and 11, wherein the indication of the underlying architecture indicates that the underlying architecture is an on-premises appliance, and wherein the application orchestrator is, when configured to automatically deploy the plurality of services, configured to: automatically deploy, based on the indication that the underlying architecture is an on-premises appliance, multiple instances of each of the plurality of services forming the control plane of the data platform as replicated containers within two or more different nodes supporting the container orchestration platform, wherein the two or more different nodes may include the one or more computing devices; and configure high availability between the replicated containers by, at least in part, configuring data replication between the replicated containers.

Example 13. The computing system of any of examples 10-12, wherein the indication of the underlying architecture indicates that the underlying architecture is an on-premises appliance, and wherein the application orchestrator is, when configured to automatically deploy the plurality of services, configured to: obtain, from the container orchestration platform, node-related events indicative of a state of a plurality of nodes supporting execution of the one or more containers within the container orchestration platform; and determine one or more impacted services of the plurality of services that were affected by the node-related event; obtain, from the container orchestration platform, metrics regarding each remaining node of the plurality of nodes not impacted by the event; determine, based on the metrics, a failover node from the remaining nodes; and automatically redeploy the one or more impacted services on the failover node as one or more failover containers within the container orchestration platform.

Example 14. The computing system of any of examples 10-13, wherein the indication of the underlying architecture indicates that the underlying architecture is an on-premises appliance, wherein the application orchestrator is, when configured to automatically deploy the plurality of services, configured to: obtain, from the container orchestration platform, metrics concerning one or more nodes supporting execution of the containers within the container orchestration platform, the one or more nodes including the one or more computing devices; and adjust deployment, based on the metrics, of at least one of the plurality of containers across the one or more nodes.

Example 15. The computing system of any of examples 10-14, wherein the application orchestrator is, when configured to automatically deploy the plurality of services, configured to: automatically identify, based on the indication of underlying architecture, the plurality of services from a plurality of available services having more services than the plurality of services; determine a deployment sequence for the plurality of services and dependencies between the plurality of services, including dependency overrides that override the dependencies between the plurality of services; and automatically deploy the plurality of services according to the deployment sequence and configuring the dependencies between the plurality of services including dependency overrides.

Example 16. The computing system of any of examples 10-15, wherein the container orchestration platform includes a pod-based container orchestration platform in which the one or more containers are arranged into one or more pods, wherein the application orchestrator is, when configured to automatically deploy the plurality of services, configured to automatically deploy, based on the indication of the underlying architecture of the one or more computing devices, the plurality of services forming the control plane as one or more containers within the container orchestration platform according to a single unified container deployment chart.

Example 17. The computing system of any of examples 10-16, wherein the container orchestration platform includes a pod-based container orchestration platform in which the one or more containers are arranged into one or more pods, and wherein the application orchestrator is further configured to manage a lifecycle of at least one of the plurality of services through monitoring a health of the plurality of services and reconciling the plurality of services to maintain a sufficient number of the one or more pods.

Example 18. The computing system of any of examples 10-17, wherein the data platform executes within the container orchestration platform, and wherein the container orchestration platform executes within a user space of an operating system executed by the one or more computing devices.

Example 19. A computer program product comprising non-transitory computer-readable media storing instructions that, when executed, cause processing circuitry to: processing circuitry configured to: execute a container orchestration platform that configures the one or more computing devices to execute one or more containers; and execute one or more containers within the container orchestration platform to implement an application orchestrator that interfaces with the container orchestration platform to automatically manage deployment of a plurality of services forming a control plane of a data platform, wherein the application orchestrator is configured to: obtain an indication of an underlying architecture of the one or more computing devices; and automatically deploy and based on the indication of the underlying architecture of the one or more computing devices, the plurality of services forming the control plane as the one or more containers managed by the container orchestration platform.

Example 20. The computer program product of example 19, wherein the indication of the underlying architecture indicates that the underlying architecture is one or more of an on-premises appliance, a private cloud, and a software as a service public cloud architecture.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements. The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:

executing, by one or more computing devices, a container orchestration platform that configures the one or more computing devices to execute one or more containers;

executing, by the one or more computing devices, the one or more containers within the container orchestration platform to implement an application orchestrator that interfaces with the container orchestration platform to automatically manage deployment of a plurality of services forming a control plane of a data platform;

obtaining, by the application orchestrator, an indication of an underlying architecture of the one or more computing devices; and automatically deploying, by the application orchestrator, and based on the indication of the underlying architecture of the one or more computing devices, the plurality of services forming the control plane as the one or more containers managed by the container orchestration platform.

2. The method of claim 1, wherein the indication of the underlying architecture indicates that the underlying architecture is one or more of an on-premises appliance, a private cloud, and a software as a service public cloud architecture.

3. The method of claim 1, wherein the indication of the underlying architecture indicates that the underlying architecture is an on-premises appliance, and wherein automatically deploying the plurality of services comprises:

automatically deploying, based on the indication that the underlying architecture is an on-premises appliance, multiple instances of each of the plurality of services forming the control plane of the data platform as replicated containers within two or more different nodes supporting the container orchestration platform, wherein the two or more different nodes may include the one or more computing devices; and configuring high availability between the replicated containers by, at least in part, configuring data replication between the replicated containers.

4. The method of claim 1, wherein the indication of the underlying architecture indicates that the underlying architecture is an on-premises appliance, and wherein automatically deploying the plurality of services comprises:

obtaining, by the application orchestrator, and from the container orchestration platform, node-related events indicative of a state of a plurality of nodes supporting execution of the one or more containers within the container orchestration platform; and determining one or more impacted services of the plurality of services that were affected by the node-related event;

obtaining, from the container orchestration platform, metrics regarding each remaining node of the plurality of nodes not impacted by the event;

determining, based on the metrics, a failover node from the remaining nodes; and automatically redeploying the one or more impacted services on the failover node as one or more failover containers within the container orchestration platform.

5. The method of claim 1, wherein the indication of the underlying architecture indicates that the underlying architecture is an on-premises appliance, wherein automatically deploying the plurality of services comprises:

obtaining, from the container orchestration platform, metrics concerning one or more nodes supporting execution of the containers within the container orchestration platform, the one or more nodes including the one or more computing devices; and adjusting deployment, based on the metrics, of at least one of the one or more containers across the one or more nodes.

6. The method of claim 1, wherein automatically deploying the plurality of services comprises:

automatically identifying, based on the indication of underlying architecture, the plurality of services from a plurality of available services having more services than the plurality of services;

determining a deployment sequence for the plurality of services and dependencies between the plurality of services, including dependency overrides that override the dependencies between the plurality of services; and automatically deploying the plurality of services according to the deployment sequence and configuring the dependencies between the plurality of services including dependency overrides.

7. The method of claim 1, wherein the container orchestration platform includes a pod-based container orchestration platform in which the one or more containers are arranged into one or more pods, wherein automatically deploying the plurality of services comprises automatically deploying, by the application orchestrator, and based on the indication of the underlying architecture of the one or more computing devices, the plurality of services forming the control plane as one or more containers within the container orchestration platform according to a single unified container deployment chart.

8. The method of claim 1, wherein the container orchestration platform includes a pod-based container orchestration platform in which the one or more containers are arranged into one or more pods, and wherein the method further comprises managing, by the application orchestrator, a lifecycle of at least one of the plurality of services through monitoring a health of the plurality of services and reconciling the plurality of services to maintain a sufficient number of the one or more pods.

9. The method of claim 1, wherein the data platform executes within the container orchestration platform, and wherein the container orchestration platform executes within a user space of an operating system executed by the one or more computing devices.

10. A computing system comprising:

a memory configured to store a plurality of services forming a control plane of a data platform; and processing circuitry configured to:

execute a container orchestration platform that configures one or more computing devices to execute one or more containers; and execute the one or more containers managed by the container orchestration platform to implement an application orchestrator that interfaces with the container orchestration platform to automatically manage deployment of the plurality of services forming the control plane of the data platform, wherein the application orchestrator is configured to:

obtain an indication of an underlying architecture of the one or more computing devices; and automatically deploy and based on the indication of the underlying architecture of the one or more computing devices, the plurality of services forming the control plane as the one or more containers managed by the container orchestration platform.

11. The computing system of claim 10, wherein the indication of the underlying architecture indicates that the underlying architecture is one or more of an on-premises appliance, a private cloud, and a software as a service public cloud architecture.

12. The computing system of claim 10, wherein the indication of the underlying architecture indicates that the underlying architecture is an on-premises appliance, and wherein the application orchestrator is, when configured to automatically deploy the plurality of services, configured to:

automatically deploy, based on the indication that the underlying architecture is an on-premises appliance, multiple instances of each of the plurality of services forming the control plane of the data platform as replicated containers within two or more different nodes supporting the container orchestration platform, wherein the two or more different nodes may include the one or more computing devices; and configure high availability between the replicated containers by, at least in part, configuring data replication between the replicated containers.

13. The computing system of claim 10, wherein the indication of the underlying architecture indicates that the underlying architecture is an on-premises appliance, and wherein the application orchestrator is, when configured to automatically deploy the plurality of services, configured to:

obtain, from the container orchestration platform, node-related events indicative of a state of a plurality of nodes supporting execution of the one or more containers within the container orchestration platform; and determine one or more impacted services of the plurality of services that were affected by the node-related event;

obtain, from the container orchestration platform, metrics regarding each remaining node of the plurality of nodes not impacted by the event;

determine, based on the metrics, a failover node from the remaining nodes; and automatically redeploy the one or more impacted services on the failover node as one or more failover containers within the container orchestration platform.

14. The computing system of claim 10, wherein the indication of the underlying architecture indicates that the underlying architecture is an on-premises appliance, wherein the application orchestrator is, when configured to automatically deploy the plurality of services, configured to:

obtain, from the container orchestration platform, metrics concerning one or more nodes supporting execution of the containers within the container orchestration platform, the one or more nodes including the one or more computing devices; and adjust deployment, based on the metrics, of at least one of the one or more containers across the one or more nodes.

15. The computing system of claim 10, wherein the application orchestrator is, when configured to automatically deploy the plurality of services, configured to:

automatically identify, based on the indication of underlying architecture, the plurality of services from a plurality of available services having more services than the plurality of services;

determine a deployment sequence for the plurality of services and dependencies between the plurality of services, including dependency overrides that override the dependencies between the plurality of services; and automatically deploy the plurality of services according to the deployment sequence and configuring the dependencies between the plurality of services including dependency overrides.

16. The computing system of claim 10, wherein the container orchestration platform includes a pod-based container orchestration platform in which the one or more containers are arranged into one or more pods, wherein the application orchestrator is, when configured to automatically deploy the plurality of services, configured to automatically deploy, based on the indication of the underlying architecture of the one or more computing devices, the plurality of services forming the control plane as one or more containers within the container orchestration platform according to a single unified container deployment chart.

17. The computing system of claim 10, wherein the container orchestration platform includes a pod-based container orchestration platform in which the one or more containers are arranged into one or more pods, and wherein the application orchestrator is further configured to manage a lifecycle of at least one of the plurality of services through monitoring a health of the plurality of services and reconciling the plurality of services to maintain a sufficient number of the one or more pods.

18. The computing system of claim 10, wherein the data platform executes within the container orchestration platform, and wherein the container orchestration platform executes within a user space of an operating system executed by the one or more computing devices.

19. A computer program product comprising non-transitory computer-readable media storing instructions that, when executed, cause processing circuitry to:

processing circuitry configured to:

execute a container orchestration platform that configures one or more computing devices to execute one or more containers; and execute one or more containers within the container orchestration platform to implement an application orchestrator that interfaces with the container orchestration platform to automatically manage deployment of a plurality of services forming a control plane of a data platform, wherein the application orchestrator is configured to:

obtain an indication of an underlying architecture of the one or more computing devices; and automatically deploy and based on the indication of the underlying architecture of the one or more computing devices, the plurality of services forming the control plane as the one or more containers managed by the container orchestration platform.

20. The computer program product of claim 19, wherein the indication of the underlying architecture indicates that the underlying architecture is one or more of an on-premises appliance, a private cloud, and a software as a service public cloud architecture.

* * * * *